United States Patent
Sheridan

(10) Patent No.: US 10,458,330 B2
(45) Date of Patent: Oct. 29, 2019

(54) AUXILIARY OIL SYSTEM FOR GEARED GAS TURBINE ENGINE

(71) Applicant: UNITED TECHNOLOGIES CORPORATION, Farmington, CT (US)

(72) Inventor: William G. Sheridan, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 480 days.

(21) Appl. No.: 15/112,869

(22) PCT Filed: Jan. 2, 2015

(86) PCT No.: PCT/US2015/010020
§ 371 (c)(1),
(2) Date: Jul. 20, 2016

(87) PCT Pub. No.: WO2015/147949
PCT Pub. Date: Oct. 1, 2015

(65) Prior Publication Data
US 2017/0002738 A1  Jan. 5, 2017
US 2018/0163625 A9  Jun. 14, 2018

Related U.S. Application Data

(60) Provisional application No. 61/929,150, filed on Jan. 20, 2014.

(51) Int. Cl.
*F02C 7/06* (2006.01)
*F02K 3/06* (2006.01)
*F01D 25/20* (2006.01)

(52) U.S. Cl.
CPC ............... *F02C 7/06* (2013.01); *F01D 25/20* (2013.01); *F02K 3/06* (2013.01);
(Continued)

(58) Field of Classification Search
CPC ........... F05D 2220/323; F05D 2260/98; F05D 2260/40311; F02C 7/06; F02K 3/06; F01D 25/20
(Continued)

(56) References Cited

U.S. PATENT DOCUMENTS 4,697,414 A  10/1987  McCarty
8,572,943 B1  11/2013  Sheridan
(Continued)

OTHER PUBLICATIONS

International Search Report from corresponding PCT/US2015/010020.
(Continued)

*Primary Examiner* — Umashankar Venkatesan
(74) *Attorney, Agent, or Firm* — Carlson, Gaskey & Olds, P.C.

(57) ABSTRACT

A gas turbine engine comprises a fan drive turbine, a fan rotor, and a gear reduction driven by the fan drive turbine to, in turn, drive the gear architecture. A main oil supply system supplies oil to components within the gear reduction, and an auxiliary oil supply system. The auxiliary oil system operates to ensure that the gear reduction will be adequately supplied with lubricant for at least 30 seconds at power should the main oil supply system fail.

17 Claims, 2 Drawing Sheets

(52) U.S. Cl.
 CPC .......... *F05D 2220/323* (2013.01); *F05D 2260/40311* (2013.01); *F05D 2260/98* (2013.01)

(58) Field of Classification Search
 USPC ...................................... 415/122.1; 184/6.11
 See application file for complete search history.

(56) References Cited

U.S. PATENT DOCUMENTS

| | | | |
|---|---|---|---|
| 2005/0166570 A1* | 8/2005 | Granitz | F01D 25/18 60/39.08 |
| 2008/0116010 A1 | 5/2008 | Portlock et al. | |
| 2008/0178833 A1* | 7/2008 | Restivo | F16N 7/40 123/196 R |
| 2010/0105516 A1 | 4/2010 | Sheridan et al. | |
| 2010/0294597 A1 | 11/2010 | Parnin | |
| 2012/0103728 A1 | 5/2012 | Portlock et al. | |
| 2012/0192570 A1 | 8/2012 | McCune et al. | |
| 2013/0319798 A1* | 12/2013 | Sheridan | F01D 25/20 184/6.11 |
| 2015/0089918 A1* | 4/2015 | Valva | F02C 7/36 60/39.08 |
| 2015/0292359 A1* | 10/2015 | Ketchum | F01D 21/00 415/1 |
| 2015/0369082 A1* | 12/2015 | Schwarz | F01D 25/18 415/177 |
| 2016/0032773 A1* | 2/2016 | James | F01D 25/20 416/170 R |

OTHER PUBLICATIONS

Supplementary European Search Report for European Application No. 15768321.0 dated Oct. 20, 2017.
International Preliminary Report on Patentability for International Application No. PCT/US2015/010020 dated Aug. 4, 2016.

* cited by examiner ary oil system.

AUXILIARY OIL SYSTEM FOR GEARED GAS TURBINE ENGINE

CROSS-REFERENCE TO RELATED APPLICATION

This application claims priority to U.S. Provisional Patent Application No. 61/929,150, filed Jan. 20, 2014.

BACKGROUND OF THE INVENTION

This application relates to an auxiliary oil system to supplement a main oil supply system on a gas turbine engine with a gear drive for a fan.

Gas turbine engines are known and, typically, include a fan delivering air into a bypass duct as propulsion air and also delivering air into a core engine. The core engine flow passes into a compressor where it is compressed and then delivered into a combustion section. The compressed air is mixed with fuel and ignited in the combustion section and products of this combustion pass downstream over turbine rotors driving them to rotate.

Historically, a turbine rotor drove the fan rotor at a single speed. This led to compromise in the desired speed for both the fan rotor and the turbine rotor. The fan rotor could not rotate unduly fast and, thus, the turbine rotor typically rotated slower than would be desired.

More recently, it has been proposed to include a gear reduction between a fan drive turbine and the fan rotor. This has allowed the fan to rotate at slower speeds and results in many efficiencies.

However, the gear reduction requires adequate lubrication and must be lubricated even under extreme flight conditions.

SUMMARY OF THE INVENTION

In a featured embodiment, a gas turbine engine comprises a fan drive turbine, a fan rotor, and a gear reduction driven by the fan drive turbine to, in turn, drive the gear architecture. A main oil supply system supplies oil to components within the gear reduction, and an auxiliary oil supply system. The auxiliary oil system operates to ensure that the gear reduction will be adequately supplied with lubricant for at least 30 seconds at power should the main oil supply system fail.

In another embodiment according to the previous embodiment, the gear reduction includes a sun gear driven by the fan drive turbine to drive intermediate gears that engage a ring gear.

In another embodiment according to any of the previous embodiments, the sun gear, the intermediate gears and the ring gear are enclosed in a bearing compartment, which captures oil removed via a scavenge line connected to a main oil pump.

In another embodiment according to any of the previous embodiments, the main oil pump has a gutter that directs scavenged oil to a main oil tank.

In another embodiment according to any of the previous embodiments, oil in the main oil tank feeds a main pump pressure stage which then delivers oil to the gear reduction.

In another embodiment according to any of the previous embodiments, oil from the main pump pressure stage passes through a lubrication system that includes at least one filter and at least one heat exchanger to cool the oil.

In another embodiment according to any of the previous embodiments, the gear reduction is surrounded by an oil gutter that scavenges oil and directs it to an auxiliary oil tank.

In another embodiment according to any of the previous embodiments, the auxiliary oil tank has an overflow conduit that allows excess oil to fall to the bottom of the bearing compartment.

In another embodiment according to any of the previous embodiments, the auxiliary oil tank has a tube with holes at a vertically higher location thereon, such that oil is drawn from the auxiliary oil tank when it is full or under negative gravity conditions.

In another embodiment according to any of the previous embodiments, the gutter is at least 70% efficient, defined as the volume of oil captured in the gutter directed to the auxiliary oil tank compared to a volume of oil that falls out of the gutter and is scavenged by the main scavenge pump.

In another embodiment according to any of the previous embodiments, the auxiliary oil supply system includes an auxiliary pump.

In another embodiment according to any of the previous embodiments, the gear reduction drives auxiliary gears which, in turn, drive the auxiliary pump, such that whenever the gear reduction is turning, it drives the auxiliary pump.

In another embodiment according to any of the previous embodiments, the auxiliary pump draws oil from the bottom of an oil sump and the bottom of the oil sump is at lower elevation than a line leading from the oil sump to the main pump scavenge stage.

In another embodiment according to any of the previous embodiments, the auxiliary pump also draws oil from the auxiliary oil tank.

In another embodiment according to any of the previous embodiments, the oil sump traps residual oil in the bearing compartment, such that oil is supplied to the auxiliary pump under negative gravity conditions as well as positive gravity conditions.

These and other features may be best understood from the following drawings and specification.

DETAILED DESCRIPTION

Figure 1:
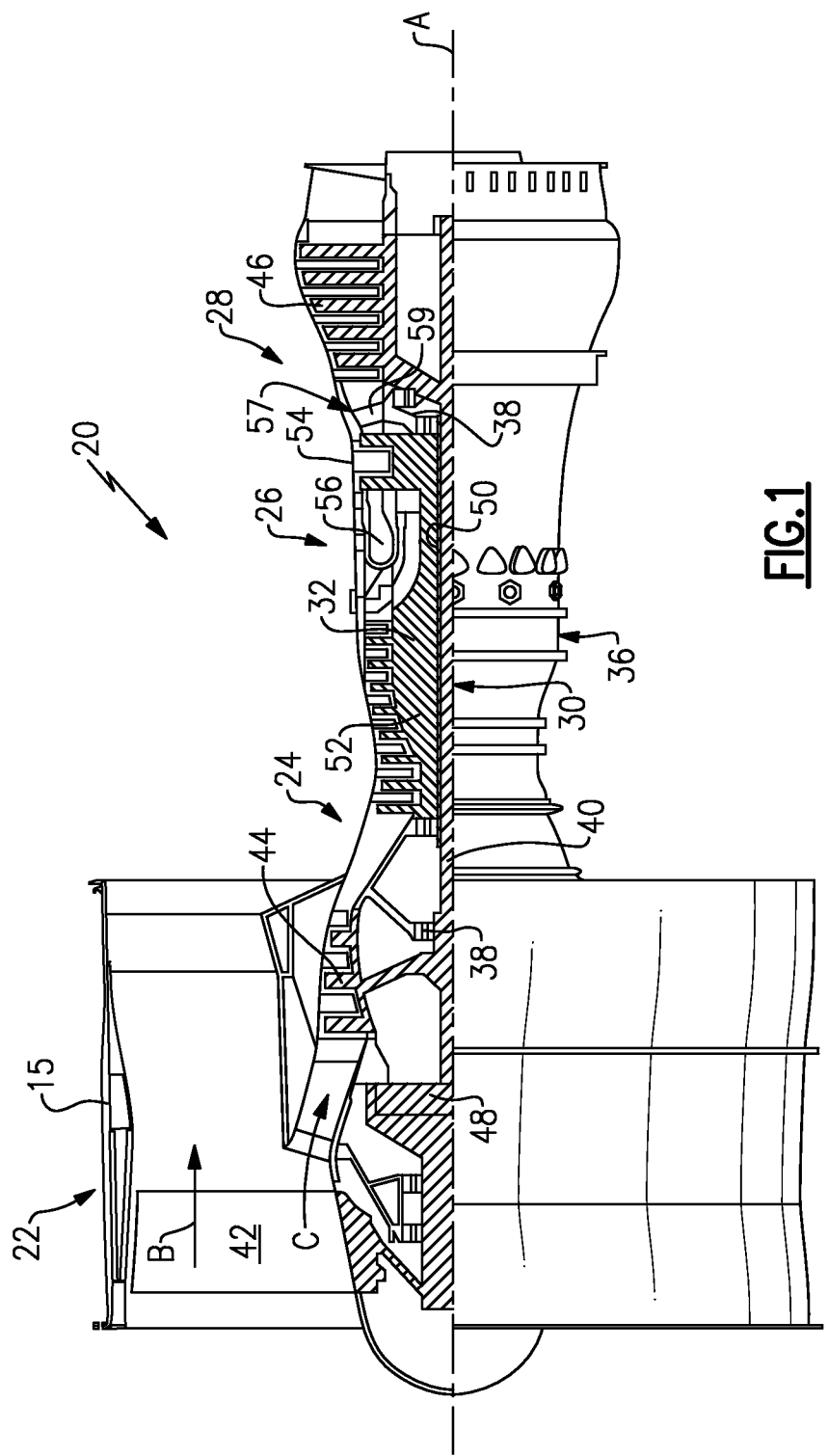
FIG. 1 shows a schematic of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ\ R)/(518.7^\circ\ R)]^{0.5}$. The "Low corrected fan tip speed" as disclosed herein according to one non-limiting embodiment is less than about 1150 ft/second.

Figure 2:
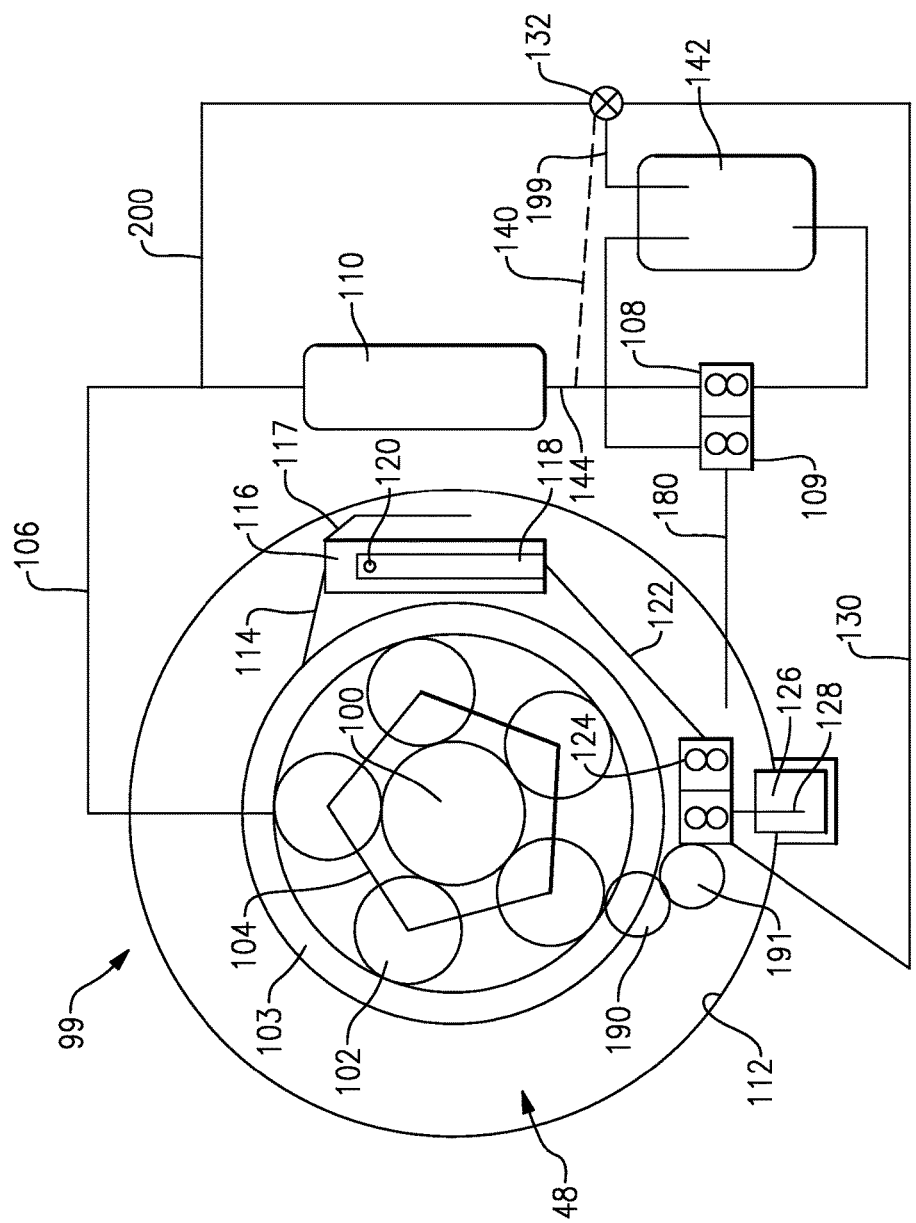
FIG. 2 is a schematic of an oil supply system.

FIG. 2 shows an oil supply system 99 for the gear reduction such as gear reduction 48 in the gas turbine engine 20 of FIG. 1. The gear reduction 48 includes a sun gear 100 which is driven by a fan drive turbine (such as turbine 46 of FIG. 1) and engages a plurality of intermediate gears 102. In some embodiments, the intermediate gears 102 may be planet gears of a planetary epicyclic gear system. In other embodiments, the intermediate gears 102 may be star gears of a star epicyclic gear system. In some embodiments, the intermediate gears 102, in turn, drive a ring gear 103 which drives a fan drive shaft to, in turn, rotate a fan (such as fan rotor 42). Other planetary gear arrangements would come within the scope of this application and the above is merely one example for a gear reduction which may be utilized to drive a fan rotor. For example, in other embodiments, a planetary gear carrier (not shown) driven by planetary gears may drive the fan shaft.

Oil supply 104 is shown schematically delivering oil to the planet gears 102. It should be understood the oil is supplied to other components such as journal pins, bearings, etc. associated with the gear architecture illustrated in FIG. 2.

Oil is supplied from a line 106 delivered from a main oil supply pump 108. A pressure stage of the main oil supply pump 108 receives oil from an oil tank 142. The oil in the oil tank 142 feeds the main pump 108 and is then conditioned in a lubrication system 110 that may contain filters to clean the oil and heat exchangers to cool the oil, as known. The oil then passes back to the gear architecture 48 through the line 106.

A bearing compartment 112 surrounds the gear reduction 48. The bearing compartment 112 has oil removed via a scavenge line 180, which returns the oil to a scavenge side 109 of the main pump 108, which, in turn, delivers the oil back to the oil tank 142.

The gear architecture is surrounded by an oil gutter 114, shown schematically, that scavenges oil from the gear architecture and directs it to an auxiliary tank 116. When tank 116 is full, an overflow conduit 117 allows excess oil to fall to the bottom of the bearing compartment 112. The gutter 114 is at least 70% efficient. This means that up to 30% of the oil falls out of the gutter and is scavenged by the main scavenge pump 109 through line 180. The 70% that is captured in the gutter is directed into the tank 116.

The detail of the oil supply 104, the gutter 114 and the gears generally may be as shown in U.S. Patent Application 2008/0116010, now U.S. Pat. No. 8,215,454, issued Jul. 10, 2012. The details of those features are incorporated herein by reference. The gear system and, in particular, the intermediate gears 102 drive auxiliary gears 190 and 191 which are shown schematically driving an auxiliary pump 124. Thus, as long as the gears 102 or 103 are being rotated, the gears 190 and 191 will drive the auxiliary pump 124.

The pump 124 draws oil from a sump 126 at a bottom of the compartment 112 through a line 128. The sump 126 is at a lower elevation than the main scavenge line 180 and also draws oil from the tank 116 through the line 122. Sump 126 will trap any residual oil in the bearing compartment 112.

There are challenges with the auxiliary pump with regard to negative gravity conditions. Further, if there is a break in the main oil supply system or windmilling of the engine when the engine is otherwise shut down, it is desirable for the engine to be able to maintain operation for at least 30 seconds at power without damage if the main oil line (108/106, etc.) ruptures. This will provide a pilot time to shut the engine down.

It is also desirable to allow the engine to windmill in the air for up to 90 minutes without damage if it is shut down for other reasons than oil system failure. It is also desirable to allow the engine to windmill indefinitely on the ground with wind speeds below 85 mph or less. As known, windmilling refers to a condition where the engine is shut down, however, air being forced into the fan rotates the fan, in turn, causing components to rotate.

Finally, it is desirable to allow an aircraft to fly under negative gravity conditions for at least 20 seconds.

All of these raise challenges with regard to operating the engine and supplying oil to the gear components.

The arrangement of the components, as described above, allow these conditions to be met.

The auxiliary pump 124 draws oil from the sump 126. Pump 124 also draws oil from a line 122. The tank 116 has a tube 118 with holes 120 at a vertically higher location, such that oil is only drawn from the tank 116 to the line 122 when it is full or under negative gravity conditions. Otherwise, oil is drained from the tank 116 by overflow through the conduit 117.

The auxiliary pump 124 supplies oil to the conduit 130 and then to a valve 132. Valve 132 senses a pressure (through line 140) in the main line 144. If the pressure is acceptable, oil from the line 130 is sent by the valve 132 back to the tank 142 through a line 199. Thus, if the pressure is acceptable, the oil is recycled for reuse during normal operation. On the other hand, if the pressure on the main line 144 is low, oil is sent into a conduit 200 and then passes into the conduit 106 to bypass the main lubrication system and feed the gear reduction 48 to ensure that the conditions as described above are met.

The conditions as described above are met in large part, since the auxiliary oil tank 116, and the tube 118, has the holes 120 only at the top, such that oil is only drawn from the tank 116, through the line 122 when it is full, or under negative G conditions. Further, since the sump 126 is at a lower elevation than a main scavenge line 180, the auxiliary pump 124 will always be supplied with oil, in both positive and negative G conditions. Further, the auxiliary pump 124, in combination with the valve 132, ensure that oil will be supplied in adequate amounts during the conditions set forth above.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A gas turbine engine comprising:
a fan drive turbine, a fan rotor, and a gear reduction driven by said fan drive turbine to, in turn, drive said gear architecture, a main oil supply system for supplying oil to components within said gear reduction, and an auxiliary oil supply system;
said auxiliary oil system being operable to ensure that the gear reduction will be adequately supplied with lubricant for at least 30 seconds at power should the main oil supply system fail;
wherein said gear reduction includes a sun gear being driven by said fan drive turbine to drive intermediate gears that engage a ring gear;
wherein said sun gear, said intermediate gears and said ring gear are enclosed in a bearing compartment, which captures oil removed via a scavenge line connected to a main oil pump;
wherein said main oil pump has an oil gutter that directs scavenge oil to a main oil tank;
wherein said gear reduction is surrounded by said oil gutter that scavenges oil and directs it to an auxiliary oil tank; and
wherein said gutter is at least 70% efficient, defined as the volume of oil captured in said gutter being directed to said auxiliary oil tank compared to a volume of oil that falls out of said gutter and is scavenged by said main scavenge pump.

2. The gas turbine engine as set forth in claim 1, wherein oil in said main oil tank feeds a main pump pressure stage which then delivers oil to said gear reduction.

3. The gas turbine engine as set forth in claim 2, wherein oil from said main pump pressure stage passes through a lubrication system that includes at least one filter and at least one heat exchanger to cool the oil.

4. The gas turbine engine as set forth in claim 1, wherein said auxiliary oil system being operable to fly with the engine in an aircraft under negative gravity conditions for at least 20 seconds.

5. A gas turbine engine comprising:
a fan drive turbine, a fan rotor, and a gear reduction driven by said fan drive turbine to, in turn, drive said gear architecture, a main oil supply system for supplying oil to components within said gear reduction, and an auxiliary oil supply system;
said auxiliary oil system being operable to ensure that the gear reduction will be adequately supplied with lubricant for at least 30 seconds at power should the main oil supply system fail;
wherein said gear reduction includes a sun gear being driven by said fan drive turbine to drive intermediate gears that engage a ring gear;
wherein said sun gear, said intermediate gears and said ring gear are enclosed in a bearing compartment, which captures oil removed via a scavenge line connected to a main oil pump;
wherein said main oil pump has an oil gutter that directs scavenge oil to a main oil tank;
wherein said gear reduction is surrounded by said oil gutter that scavenges oil and directs it to an auxiliary oil tank; and
wherein said auxiliary oil tank has an overflow conduit that allows excess oil to fall to the bottom of said bearing compartment.

6. The gas turbine engine as set forth in claim 5, wherein said auxiliary oil tank has a tube with holes at a vertically higher location thereon, such that oil is drawn from said auxiliary oil tank when it is full or under negative gravity conditions.

7. The gas turbine engine as set forth in claim 5, wherein said gutter is at least 70% efficient, defined as the volume of oil captured in said gutter being directed to said auxiliary oil tank compared to a volume of oil that falls out of said gutter and is scavenged by said main scavenge pump.

8. The gas turbine engine as set forth in claim 5, wherein said auxiliary oil supply system includes an auxiliary pump.

9. The gas turbine engine as set forth in claim 8, wherein said gear reduction drives auxiliary gears which, in turn, drive said auxiliary pump, such that whenever said gear reduction is turning, it drives said auxiliary pump.

10. The gas turbine engine as set forth in claim 8, wherein said auxiliary pump supplies oil to a conduit and then to a valve, and said valve sensing pressure in a line associated with said main lubricant supply.

11. The gas turbine engine as set forth in claim 10, wherein if said sensed pressure is adequate, oil is supplied from said auxiliary pump back into said main oil tank.

12. The gas turbine engine as set forth in claim 11, wherein if the oil pressure associated with said main oil supply system is below an adequate pressure, oil is sent from said auxiliary pump to said gear reduction.

13. A gas turbine engine comprising:
   a fan drive turbine, a fan rotor, and a gear reduction driven by said fan drive turbine to, in turn, drive said gear architecture, a main oil supply system for supplying oil to components within said gear reduction, and an auxiliary oil supply system;
   said auxiliary oil system being operable to ensure that the gear reduction will be adequately supplied with lubricant for at least 30 seconds at power should the main oil supply system fail;
   wherein said gear reduction includes a sun gear being driven by said fan drive turbine to drive intermediate gears that engage a ring gear;
   wherein said sun gear, said intermediate gears and said ring gear are enclosed in a bearing compartment, which captures oil removed via a scavenge line connected to a main oil pump; and
   wherein said main oil pump has an oil gutter that directs scavenge oil to a main oil tank;
   wherein said auxiliary oil supply system includes an auxiliary pump;
   wherein said gear reduction is surrounded by said oil gutter that scavenges oil and directs it to an auxiliary oil tank; and
   wherein said auxiliary pump draws oil from the bottom of an oil sump and said bottom of said oil sump is at lower elevation than a line leading from said oil sump to said main pump scavenge stage.

14. The gas turbine engine as set forth in claim 13, wherein said auxiliary pump also draws oil from said auxiliary oil tank.

15. The gas turbine engine as set forth in claim 13, wherein said oil sump traps residual oil in said bearing compartment, such that oil is supplied to said auxiliary pump under negative gravity conditions as well as positive gravity conditions.

16. The gas turbine engine as set forth in claim 15, wherein said auxiliary oil tank has a tube with holes at a vertically higher location thereon, such that oil is drawn from said auxiliary oil tank when it is full or under negative gravity conditions.

17. The gas turbine engine as set forth in claim 16, wherein oil is also drawn from said auxiliary tank when said tank is full and through overflow through said overflow conduit.

\* \* \* \* \*